(12) United States Patent
Odaohhara

(10) Patent No.: US 6,822,424 B2
(45) Date of Patent: Nov. 23, 2004

(54) TROUBLE RECOGNITION OF AN INTELLIGENT BATTERY AND THE RESETTING THEREOF

(75) Inventor: Shigefumi Odaohhara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/304,247

(22) Filed: Nov. 26, 2002

(65) Prior Publication Data

US 2003/0115001 A1 Jun. 19, 2003

(30) Foreign Application Priority Data

Nov. 29, 2001 (JP) .................................... 2001-365081

(51) Int. Cl.$^7$ ..................... H01M 10/44; H01M 10/46
(52) U.S. Cl. ..................................... 320/136
(58) Field of Search ............................... 320/127, 132, 320/134, 136; 429/61; 702/63

(56) References Cited

U.S. PATENT DOCUMENTS

| | | | | |
|---|---|---|---|---|
| 5,955,869 A | * | 9/1999 | Rathmann | 320/132 |
| 6,025,695 A | * | 2/2000 | Friel et al. | 320/106 |
| 6,545,448 B1 | * | 4/2003 | Stanley et al. | 320/132 |
| 2003/0175560 A1 | * | 9/2003 | Kim et al. | 429/7 |

* cited by examiner

Primary Examiner—Edward H. Tso
(74) Attorney, Agent, or Firm—Carlos Munoz-Bustamante

(57) ABSTRACT

The apparatus of this invention has a resetting function for software- or hardware-resetting a battery when a CPU in the battery hangs up and becomes inoperable or inoperative to make it possible to recover the CPU of the battery from a hung state. An electrical apparatus having a body for consuming power and constituted so as to be able to connect with a battery for supplying power to the body by discharging after the battery has been charged. The apparatus has a trouble recognition mechanism for recognizing trouble in the battery and a resetting mechanism for resetting the battery in accordance with the recognition by the trouble recognition mechanism.

19 Claims, 8 Drawing Sheets

SMBus Protocol : Read Word

| Name | Setting | Description |
|---|---|---|
| bit 15 | Return code | 0 : Normal completion<br>1 : Error found |

Fig. 7

TROUBLE RECOGNITION OF AN INTELLIGENT BATTERY AND THE RESETTING THEREOF

FIELD AND BACKGROUND OF INVENTION

The present invention relates to an electrical apparatus constituted so as to be able to connect with a battery for discharging after being charged, more particularly to an electrical apparatus capable of connecting with an intelligent battery including a CPU.

Power is directly supplied from a commercial power source such as an AC adapter to electrical apparatuses such as an information terminal unit represented by a notebook-type personal computer (notebook PC), a personal unit such as a PDA (Personal Digital Assistant), various types of audio units, and a video camera and moreover, power is supplied to these units from a battery (storage battery, secondary battery, or battery) which can be used many times while repeating charge and discharge. This type of battery uses a nickel-hydrogen battery (NiMH battery) or nickel-cadmium battery that has a large capacity and a low price. Moreover, there are a lithium-ion battery having an energy density for unit weight higher than that of a nickel-cadmium battery and a lithium-polymer battery using a solid polymer instead of a liquid electrolyte.

In the case of a battery constituted so as to be able to connect with an electrical apparatus as a battery pack uses the so-called intelligent battery including a CPU. The CPU of the intelligent battery executes various types of controls such as generation of various types of information about batteries and holding of information including receiving of current and voltage measurement results when cells in an intelligent battery are charged and discharged and checking of these measurement results, checking of the number of cycles, and obtaining of the information about service lives. Moreover, the CPU realizes the communication with a system in accordance with a protocol conforming to the SBS (Smart Battery System) by being connected to a system-side controller to be connected. Furthermore, an intelligent battery having a plurality of CPUs instead of one CPU is used.

However, a CPU of an intelligent battery may hang up and become inoperable or inoperative due to ESD (ElectroStatic Discharge) which damages an electronic unit and a circuit due to discharge of accumulated static electricity. In this case, the CPU cannot normally send various pieces of information of a battery to a system and an error due to communication failure is displayed on a LED or a screen of the system side.

In this case, when a CPU provided for a general apparatus hangs up, it is possible to restore the CPU from the hang-up state by turning on/off the power source and thereby resetting the CPU. However, an intelligent battery formed as a battery pack generally does not have a resetting function and therefore, there is no way that the built-in CPU recovers from the hang-up state. In this case, it is unavoidable to handle the intelligent battery as a defective battery though the battery is not damaged in hardware and a problem on economy is also large.

SUMMARY OF THE INVENTION

The present invention is made to solve the above problems and its purpose is to restore a malfunctioning battery to a normal state and reduce the number of defective batteries.

It is another purpose of the present invention to optimize the recovery of a battery from a hang-up state by stepwise resetting.

To achieve the above purposes, the present invention has a resetting function for software- or hardware-resetting a battery when a CPU in the battery hangs up and becomes inoperable or inoperative to make it possible to recover the CPU of the battery from a hang-up state. That is, the present invention is an electrical apparatus having a body for consuming power and constituted so as to be able to connect with a battery for supplying power to the body by discharging after being charged, comprising trouble recognition means for recognizing a trouble of the battery and resetting means for resetting the battery in accordance with the recognition by the trouble recognition means.

Moreover, the present invention comprises a system for consuming power, a CPU for communicating with the system, and a battery for supplying power to the system by discharging after being charged to reset the CPU of the battery when the CPU hangs up and becomes inoperable.

In this case, the system outputs a resetting command using a communication protocol to the CPU of the battery and the CPU of the battery executes the resetting command and then outputs the completion of the resetting command to the system. Therefore, the system is preferable in that it can correspond to a predetermined trouble that can be solved through software resetting. Moreover, the system hardware-resets the CPU of the battery by using a signal line extending between the battery and the system. Therefore, the system is superior in that it is possible to restore a hung-up intelligent battery to a normal state even if a trouble that cannot be solved by software resetting or a trouble preventing communication occurs.

Moreover, the present invention is a computer equipment constituted so as to be able to connect with a battery for discharging after being charged to supply power from the battery to a system, comprising a controller for controlling the battery and communicating with the battery and a CPU of the system for executing a utility program of the battery and the controller resets the battery in accordance with a designation from the utility program when it is recognized that a trouble occurs in the communication with the battery. Furthermore, the present invention further comprises a display for displaying a screen for prompting a user to execute resetting when the controller recognizes that a trouble occurs in the communication with the battery. Because the display displays a screen for prompting a user to execute refreshing for completely discharging a battery after resetting the battery, it is superior in that the actual-capacity data of the battery can be suited for the remaining capacity data of the battery.

Moreover, the present invention is a computer equipment capable of connecting with a battery for supplying power to a system by discharging after being charged, comprising communication means for communicating with the battery in accordance with a predetermined protocol, software-resetting means for software-resetting the battery by using the communication means when a predetermined trouble occurs in the communication by the communication means, and hardware-resetting means for forcibly initializing the battery.

In this case, the software resetting means software-resets a battery by using a software-resetting command in which an existing protocol such as the SBS is extended. Moreover, the hardware-resetting means hardware-resets a battery by using a terminal for a system to recognize presence or absence of the battery.

From another viewpoint, the present invention is an intelligent battery connected to an electrical apparatus to supply power to the electrical apparatus by discharging after being charged, comprising a cell for supplying power, a CPU for recognizing a state of the cell and communicating with the electrical apparatus, and resetting means for resetting the CPU in accordance with the control by the electrical apparatus. In this case, the resetting means performs software resetting for resetting a program to be executed by a CPU and/or hardware resetting to be applied to the resetting terminal of the CPU.

Moreover, the present invention can be regarded as a control method of a battery connected to a body for consuming power to supply power to the body by discharging after being charged. An aspect of the present invention determines whether a predetermined trouble occurs in the communication between a battery and a body and when it is determined that the predetermined trouble occurs, software resetting is designated to a user and when software resetting is designated by the user, the battery is software-reset. Moreover, it is determined whether the communication can be made between the battery and the body and when communication cannot be made, the battery is hardware-reset. Furthermore, it is determined whether a predetermined trouble occurs in the communication between the battery and the body, software resetting is executed when it is determined that the predetermined trouble occurs, and when software resetting does not normally end, hardware resetting is applied to the battery.

BRIEF DESCRIPTION OF THE INVENTION

Some of the purposes of the invention having been stated, others will appear as the description proceeds, when taken in connection with the accompanying drawings, in which:

FIG. 7 is an illustration for explaining a software resetting method; and

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
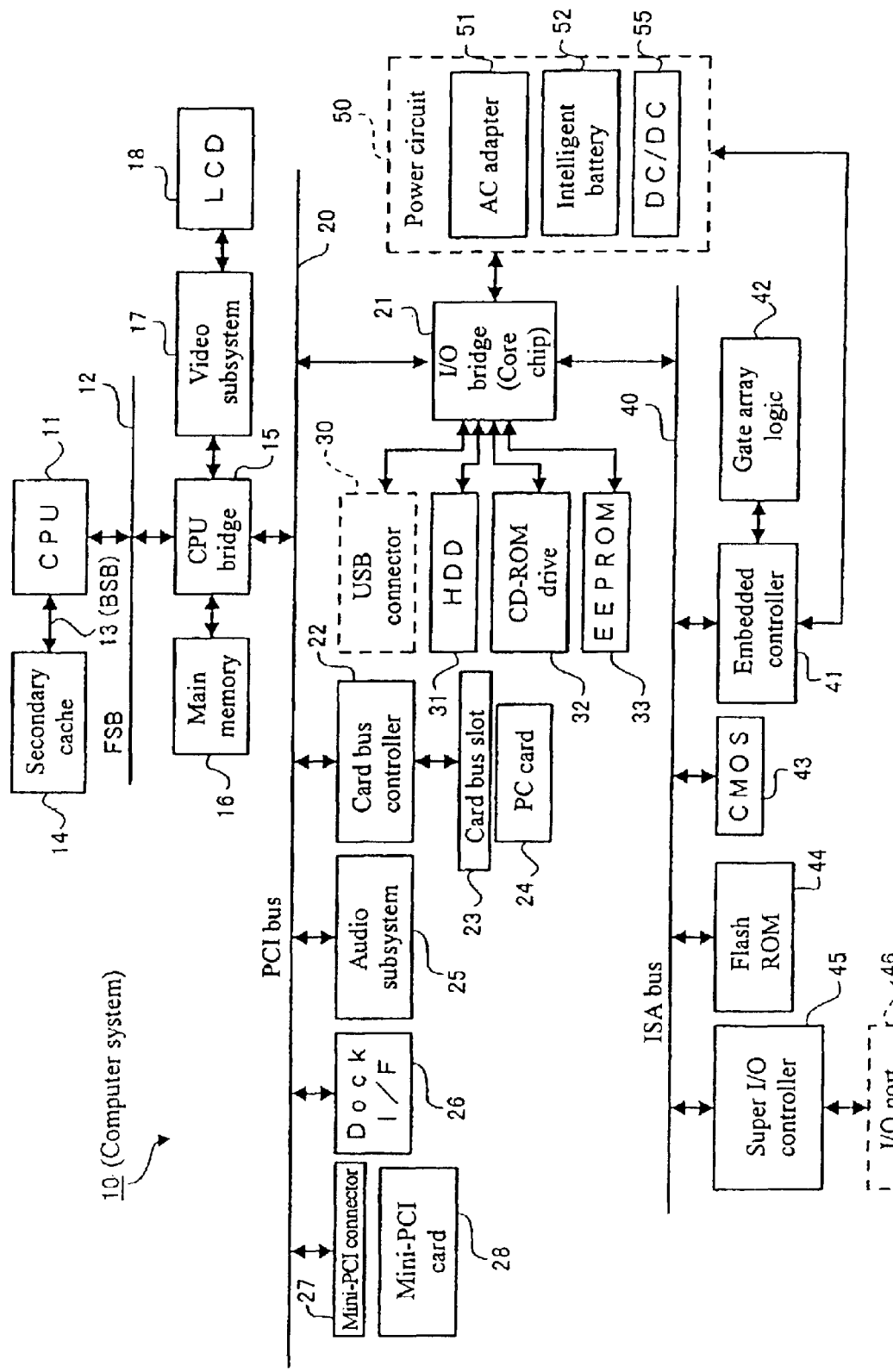
FIG. 1 is an illustration showing a hardware configuration of a computer system serving as an electrical apparatus to which the present embodiment is applied.

FIG. 1 is an illustration showing a hardware configuration of a computer system 10 that is an electrical apparatus to which this embodiment is applied. A computer equipment comprising the computer system 10 is constituted as a notebook PC (notebook-type personal computer) mounting a predetermined OS in accordance with the OADG (Open Architecture Developer's Group) specification.

In the case of the computer system 10 shown in FIG. 1, a CPU 11 functions as the brain of the system 10 to execute various programs in addition to a utility program. The CPU 11 is connected with various components through three stages of buses such as an FSB (Front Side Bus) 12, a PCI (Peripheral Component Interconnect) bus 20 serving as a bus for a high-speed I/O unit, and an ISA (Industry Standard Architecture) bus 40 serving as a bus for a low-speed I/O unit. The CPU 11 accelerates the processing speed by storing a program code and data in a cache memory. In recent years, an SRAM of approx. 128 KB is integrated in the CPU 11 as a primary cache. However, to replenish a capacity, a secondary cache 14 of 512 K to 2 MB is set through a BSB (Back Side Bus) 13 serving as an exclusive bus. It is also possible to reduce the cost by omitting the BSB 13, connecting the secondary cache 14 to the FSB 12 and thereby avoiding a package having a large number of terminals.

The FSB 12 is communicated with the PCI but 20 by a CPU bridge (host-PCI bridge) 15 referred to as memory/PCI chip. The CPU bridge 15 is constituted by including a memory controller function for controlling an access to a main memory 16 and a data buffer for absorbing the difference between data transfer rates of the FSB 12 and PCI bus 20. The main memory 16 is a writable memory used as an area for reading an execution program of the CPU 11 or a work area in which the processing data of the execution program will be written. For example, the main memory 16 is constituted by a plurality of DRAM chips and normally equipped with 64 MB so that it can be extended up to 320 MB. The execution program includes firmware such as various drivers for hardware-operating an OS and peripheral units, an application program for a specific business, a BIOS (Basic Input/Output System) stored in a flash ROM 44 to be described later.

A video subsystem 17 is a subsystem for realizing a function relating to video and includes a video controller. The video controller processes a drawing instruction output from the CPU 11, writes the processed drawing information in a video memory, reads the drawing information from the video memory, and output the information to a liquid-crystal display (LCD) 18 as drawing data.

The PCI bus 20 is a bus capable of transferring data at a comparatively high speed, which is standardized in accordance with a specification specifying a data bus width as 32 or 64 bits, the maximum operating frequency as 33 or 66 MHz, and the maximum data transfer rate as 132 MB/sec or 528 MB/sec. The PCI bus 20 connects with an I/O bridge 21, a card-bus controller 22, an audio subsystem 25, a docking-station interface (Dock I/F) 26, and a mini-PCI connector 27.

The card bus controller 22 is an exclusive controller for directly connecting a bus signal of the PCI bus 20 to the interface connector (card bus) of a card-bus slot 23 and it is possible to load a PC card 24 to the card-bus slot 23. The docking-station interface 26 is hardware for connecting a docking station (not illustrated) serving as the function extender of the computer system 10. When a notebook PC is set to the docking station, various hardware elements connected to an internal bus of the docking station are connected to the PCI bus 20 through the docking-station interface 26. Moreover, a mini-PCI card 28 is connected to the mini-PCI connector 27.

The I/O bridge 21 has a function for bridging the PCI bus 20 and the ISA bus 40. Moreover, the I/O bridge 21 has a DMA controller function, programmable interrupt controller (PIC) function, programmable interval timer (PIT) function, IDE (Integrated Device Electronics) interface function, USB (Universal Serial Bus) function, and SMB (System Management Bus) interface function and has a built-in real time clock (RTC).

The DMA controller function is a function for transfer data between a peripheral unit such as an FDD and the main memory 16 without using the CPU 11. The PIC function is a function for executing a predetermined program (interrupt handler) in response to an interrupt request from a peripheral unit. The PIT function is a function for generating a timer signal at a predetermined cycle. Moreover, an interface realized by the IDE interface function connects with an IDE hard-disk drive (HDD) 31 and moreover, ATAPI(AT Attachment Packet Interface)-connects with a CD-ROM drive 32. It is allowed that the interface connects with other type of IDE unit such as a DVD (Digital Versatile Disk) drive instead of the CD-ROM drive 32. External memories such as the HDD 31 and CD-ROM drive 32 are housed in a housing place referred to as "media bay" or "device bay" in the body of a notebook PC. These normally-set external memories may be set exchangeably with and exclusively to other units such as an FDD and a battery pack.

Moreover, the I/O bridge 21 has a USB port that is connected with a USB connector 30 set to the wall face of the body of a notebook PC. Furthermore, the I/O bridge 21 connects with an EEPROM 33 through an SM bus. The EEPROM 33 is a nonvolatile memory for holding pieces of information such as a password, supervisor password, and product serial number entered by a user and the data in the EEPROM 33 can be electrically rewritten.

Furthermore, the I/O bridge 21 is connected to a power circuit 50. The power circuit 50 has an AC adapter 51 connected to a 100-VAC commercial power source to perform AC/DC conversion, an intelligent battery 52 serving as a battery (secondary battery) constituted by a nickel-hydrogen battery or nickel-cadmium battery used by repeating charge and discharge, and a circuit of a DC/DC converter (DC/DC) 55 for generating DC constant voltages such as +15 V, +5 V, and +3.3 V sued for the computer system 10. The intelligent battery 52 is an intelligent battery including a CPU and communicating with an embedded controller 41 (to be described later) in accordance with an SBS (Smart Battery System). In the case of this embodiment, the intelligent battery 52 is constituted as a battery pack so that it can be set to and removed from the system of a notebook PC.

An internal register for controlling the power-source state of the computer system 10 and a logic (state machine) for controlling the power-source state of the computer system 10 including operations of the internal register are set in a core chip constituting the I/O bridge 21. The logic is transceives various signals with the power circuit 50 and recognizes an actual state of power supply from the power circuit 50 to the computer system 10 by transceiving the signals. The power circuit 50 controls supply of power to the computer system 10 in accordance with a designation from the logic.

The ISA bus 40 is a bus having a data-transfer rate lower than that of the PCI bus 20 (e.g. bus width of 16 bits and maximum data-transfer rate of 4 MB/sec). The ISA bus 40 connects with the embedded controller 41 connected to a gate array logic 42, a CMOS 43, a flash ROM 44, and a super I/O controller 45. Moreover, the ISA bus 40 is also used to connect peripheral units operating at a comparatively-low speed such as a keyboard and a mouse controller. The super I/O controller 45 connects with an I/O port 46 to control driving of an FDD, input/output of parallel data (PIO) through a parallel port, and input/output of serial data (SIO) through a serial port.

The embedded controller 41 controls a not-illustrated keyboard and is connected to the power circuit 50 to bear some of power-source control functions together with the gate array logic 42 by a built-in power management controller (PMC).

Figure 2:
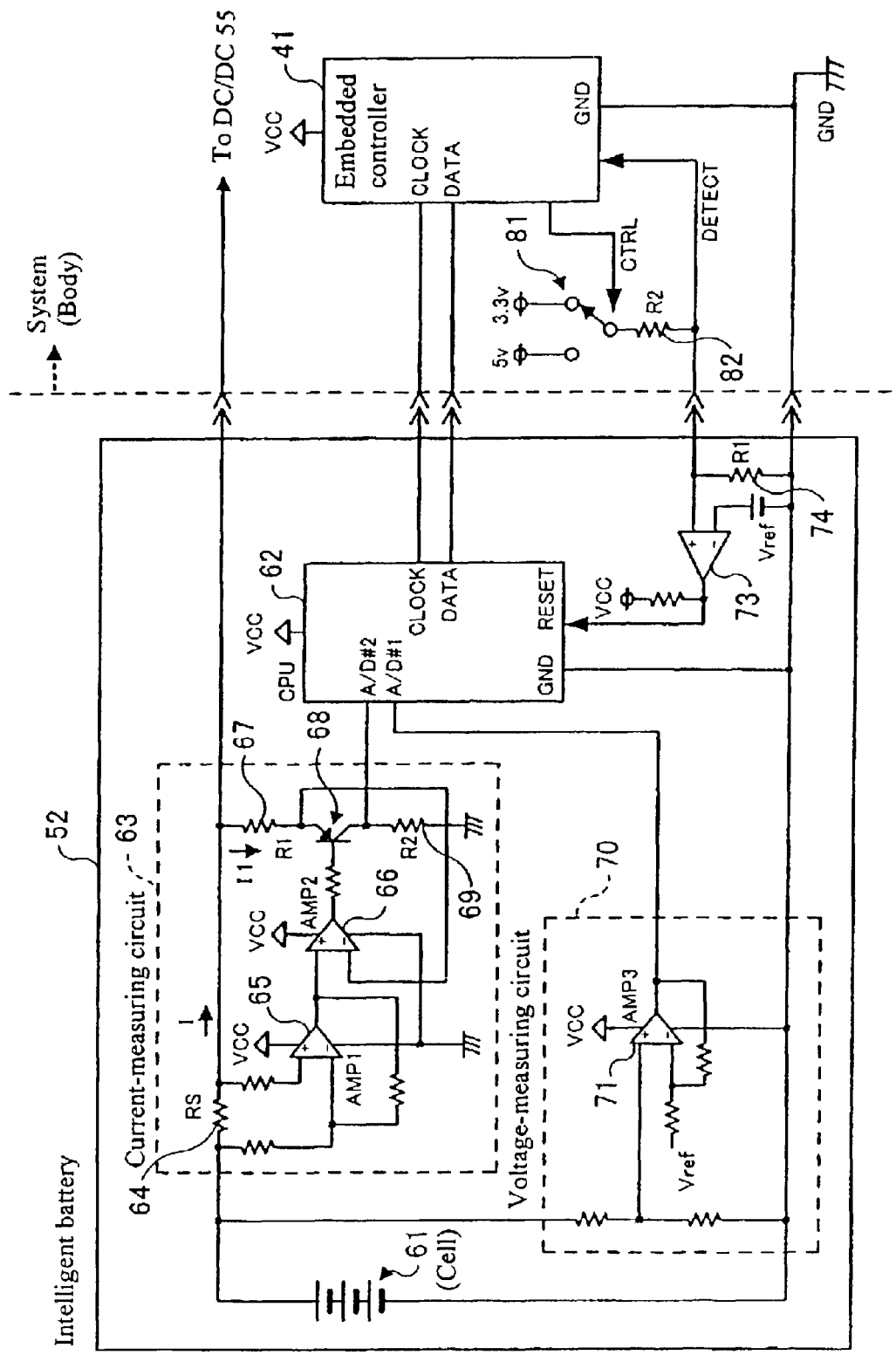
FIG. 2 is an illustration showing a configuration of a power circuit to which this embodiment is applied.

FIG. 2 is an illustration showing a configuration of a power-supply circuit to which this embodiment is applied, showing a first hardware configuration for performing hardware resetting (hard reset) by using a T-terminal for determining presence or absence of a battery (in the specification of the SBS, the T-terminal is described as 'T-pin' or 'Thermistor'). In the case of the power-supply circuit shown in FIG. 2, the following are shown: an intelligent battery 52 serving as a secondary battery (battery or storage battery) constituted by a lithium-ion battery used by repeating charge and discharge and conforming to the SBS (Smart Battery System) and an embedded controller 41 set to the system (body) side to communicate with the intelligent battery 52. The communication between the intelligent battery 52 and the embedded controller 41 is realized by an SM bus constituted by a CLOCK signal and a DATA signal and a soft-resetting command (to be described later) output from the embedded controller 41 is output to the SM bus and thereby, software resetting (soft reset) is executed for the intelligent battery 52. Moreover, a switch 81 for switching voltage levels of a DETECT signal and a resistance (R2) 82 are set between the embedded controller 41 and intelligent battery 52 in order to perform hardware resetting. The switch 81 does not always denote only a mechanical switch but it is realistic to realize the switch 81 by combining electronic circuits such as FETs. Moreover, the resistance (R2) 82 uses a resistance having a resistance value of approx. 6.2 KΩ.

As shown in FIG. 2, the intelligent battery 52 as a battery for discharging after being charged, comprises a cell (battery cell) 61 constituted by a plurality of single cells, a CPU 62 for controlling the intelligent battery 52 and communicating with the embedded controller 41, a current-measuring circuit 63 for obtaining the value of a current discharged from the cell 61, and a voltage-measuring circuit 70 for obtaining the voltage of the cell 61. The cell 61 is a lithium-ion multi-cell battery constituted by six two-parallel three-series (1.8 Ah/cell) cells.

Moreover, the intelligent battery 52 comprises a comparator 73 and a resistance (R1) 74 as a circuit for resetting the CPU 62. The resistance (R1) 74 uses a resistance having a resistance value of approx. 10 KΩ and is used for the embedded controller 41 to detect the connection of the intelligent battery 52. It is also allowed to use a temperature detector such as a thermistor instead of the resistance (R1) 74. When the intelligent battery 52 is not connected, a DETECT signal has 3.3 V because the resistance (R1) 74 is not present. When the intelligent battery 52 is connected, the DETECT signal shows a voltage value obtained by dividing 3.3 V with the resistance (R1) 74 and the resistance (R2) 82. Thereby, the embedded controller 41 can detect presence or absence of a battery.

n the intelligent battery 52, however, a voltage obtained by dividing a voltage switched by the system-side switch 81 with the resistance (R1) 74 and the resistance (R2) 82 is input to one input terminal (T-terminal) of the comparator 73 and a reference voltage Vref is input to the other input terminal of the comparator 73. When an output of the comparator 73 becomes HIGH, the CPU 62 is reset.

The CPU 62 set in the intelligent battery 52 A/D(Analog-to-Digital)-converts analog signals which are measurement results input from the current-measuring circuit 63 and voltage-measuring circuit 70 and holds a current value and a voltage value output from the cell 61. Moreover, the CPU 62 holds various pieces of information about a battery including the capacity of the battery. The held various pieces of information about an output current and a battery are transmitted to the embedded controller 41 at the system side by using the protocol of the SBS through to communication lines DATA and CLOCK.

In the current-measuring circuit 63, a potential difference of a voltage I×RS is generated at the both ends of a resistance (RS) 64. The voltage is differentially amplified by an operational amplifier (AMP1) 65. Moreover, a current l1 proportional to an output voltage of the operational amplifier (AMP1) 65 is circulated through the resistance (R1) 67 by an operational amplifier (AMP2) 66 and a transistor 68. Finally, it is possible to convert the value of the current l of the intelligent battery 52 into a voltage (l1'R2) generated in a resistance (R2) 69. The voltage (l1'R2) is input to the A/D #2 port of the CPU 62 and A/D-converted by the CPU 62. In the voltage-measuring circuit 70, the voltage of the intelligent battery 52 is measured. Specifically, the voltage of the cell 61 in the intelligent battery 52 is differentially amplified by an operational amplifier (AMP3) 71 and converted and temporarily dropped to a low voltage, and input to the A/D #1 port of the CPU 62 and A/D-converted by the CPU 62.

Figure 3:
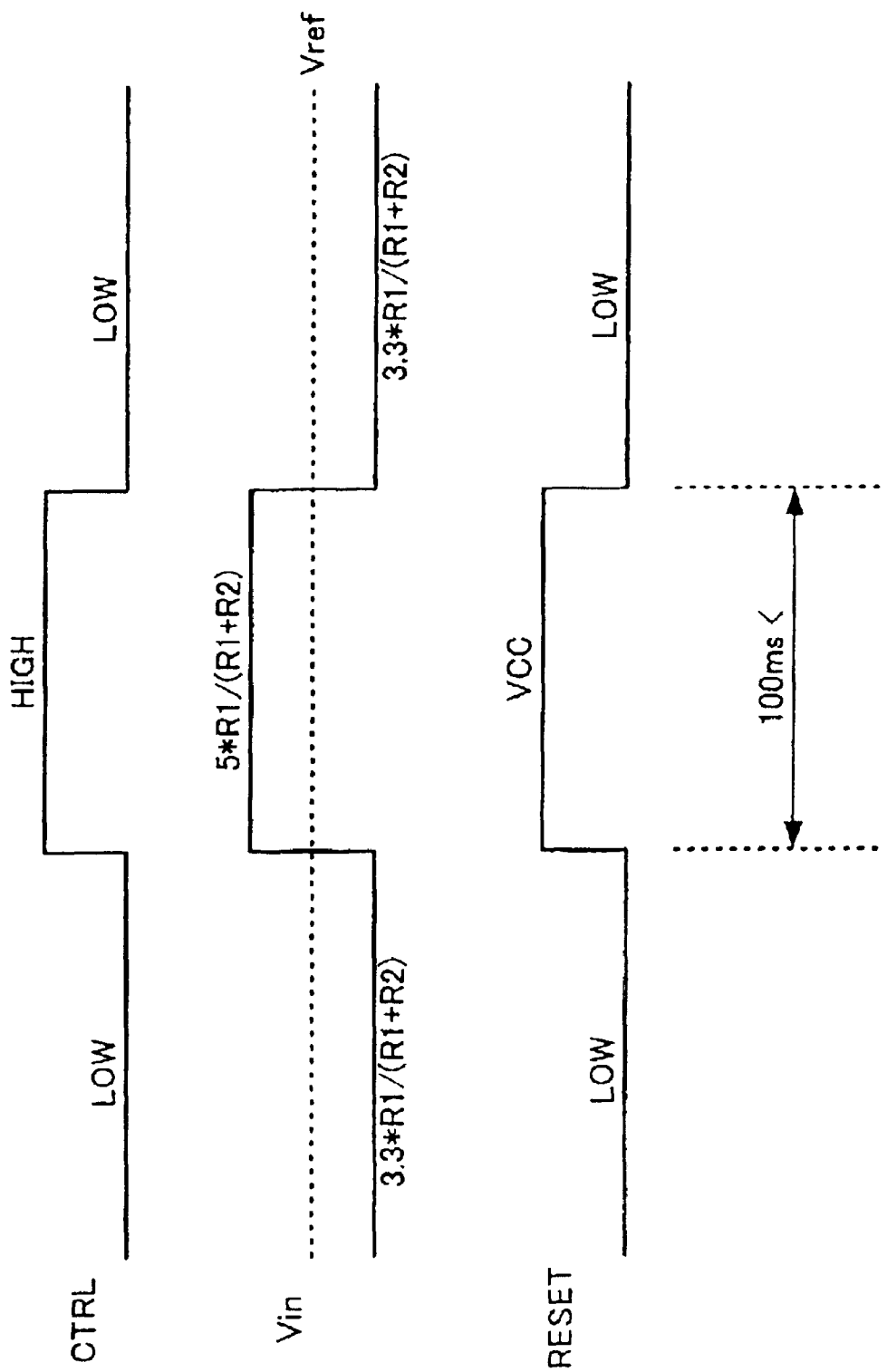
FIG. 3 is an illustration showing timings of hardware resetting in this embodiment.

FIG. 3 is an illustration showing the timing of hardware resetting in this embodiment. To hardware-reset the CPU 62 in the intelligent battery 52, it is assumed that the resetting terminal (RESET) of the CPU 62 is set to high level for 100 ms as the design specification. In this case, the voltage value obtained by dividing 3.3 V with the resistance (R1) 74 and resistance (R2) 82 is set so as to be lower than the reference voltage Vref and the voltage value obtained by dividing 5 V with the resistance (R1) 74 and resistance (R2) 82 is set so as to be higher than the reference voltage Vref. To hardware-reset the intelligent battery 52, the embedded controller 41 changes a control signal (CTRL) from LOW to HIGH for 100 ms as shown in the timing (top one) in FIG. 3 and the resistance (R2) 82 is connected to 5 V by the switch 81 for 100 ms. Then, as shown by the timing (middle one) in FIG. 3, a voltage obtained by resistance-dividing 5 V is input to one input terminal of the comparator 73 for 100 ms. In this case, as shown by the timing (bottom one) in FIG. 3, an output of the comparator 73 is kept high-level (Vcc) for 100 ms. That is, it is possible to output a reset signal (RESET) by hardware. According to this operation, the embedded controller 41 can reset the intelligent battery 52.

Figure 4:
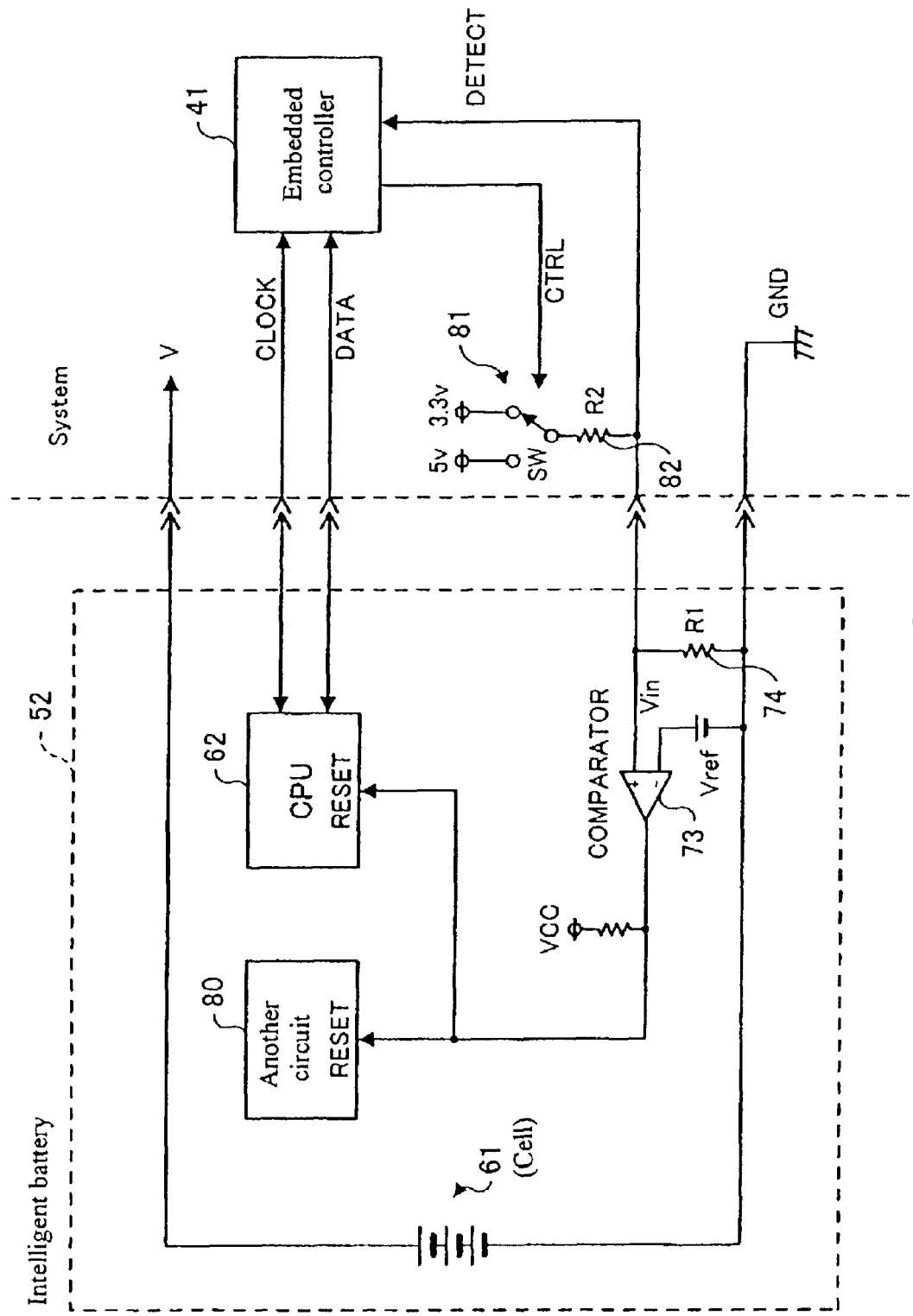
FIG. 4 is an illustration showing a configuration of another circuit for realizing hardware resetting.

FIG. 4 is an illustration showing another circuit configuration for realizing hardware resetting. The circuit configuration in FIG. 4 is different from that shown in FIG. 2 in that it is possible to reset another circuit 80 constituting the intelligent battery 52 in addition to the CPU 62. The intelligent battery 52 may have another CPU chip in addition to the CPU 62. By considering this circuit configuration, it is also possible to hardware-reset the circuit 80. In this case, the circuit configuration is simplified to easily understand the circuit 80. The circuit 80 uses, for example, a CPU for individually controlling a protection circuit and current- and voltage-measuring circuits. A configuration of a circuit to be actually hardware-reset is the same as that shown in FIG. 2 but detailed description of the configuration is omitted.

Figure 5:
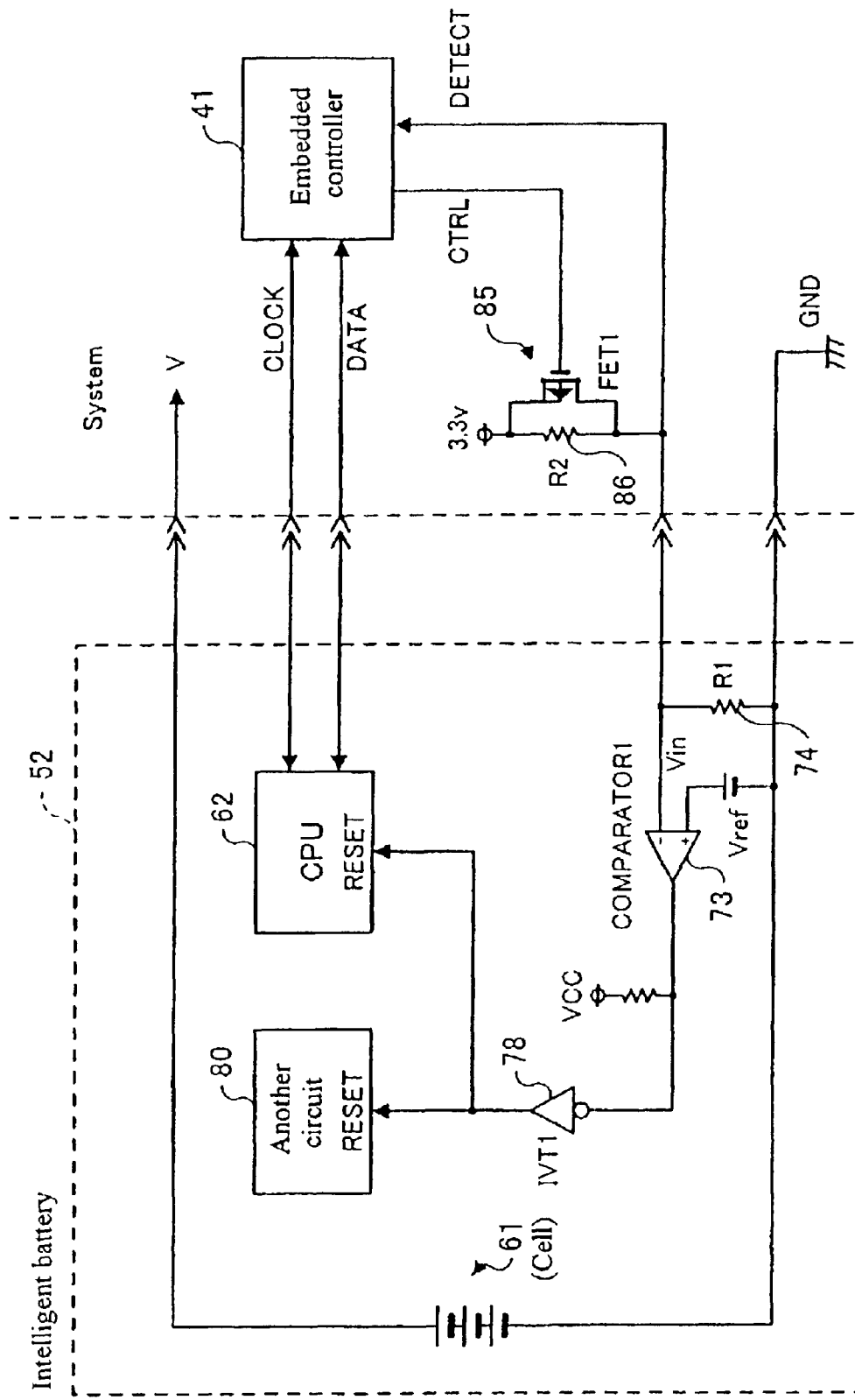
FIG. 5 is an illustration showing a configuration of still another circuit for realizing hardware resetting.

FIG. 5 is an illustration showing still another circuit configuration for realizing hardware resetting, which similarly realizes resetting by using a T-terminal. In this case, a resistance (R2) 86 connected to 3.3 V and a field-effect transistor (FET1) 85 controlled in accordance with a control signal (CTRL) output from the embedded controller 41 are set at the system side. Moreover, the system side has an inverter (IVT1) 78 for inverting an output of the comparator 73 of the intelligent battery 52 and an output of the inverter (IVT1) 78 is input to the resetting terminals (RESETs) of the CPU 62 and the circuit 80.

In this case, the embedded controller 41 usually outputs a control signal (CTRL) of HIGH level (3.3 V). In this case, because the field effect transistor (FET1) 85 is turned off, a voltage of 3.3×R1/(R1+R2) is input to the negative terminal of the comparator 73. Though the reference voltage Vref is input to the positive terminal of the comparator 73, the reference voltage Vref is set to a value for meeting the following condition.

$$3.3 \times R1/(R1+R2) < Vref < 3.3V$$

When a control signal (CTRL) is kept HIGH-level, the following expression is effectuated.

$$3.3 \times R1/(R1+R2) < Vref$$

Therefore, an output of the comparator 73 becomes HIGH-level. Because an output level is inverted by the inverter (IVT1) 78, resetting terminals (RESETs) of the CPU 62 and the circuit 80 are set to LOW level (state in which resetting is not applied).

Then, when it is necessary to hardware-reset the intelligent battery 52 because of any reason such as hang-up due to ESD (ElectroStatic Discharge), the embedded controller 41 outputs a LOW-level control signal (CTRL). As a result, the field effect transistor (FET1) 85 is turned on and the negative terminal of the comparator 73 has 3.3 V. Because Vref is lower than 3.3 V, an output of the comparator 73 becomes LOW-level. A signal is inverted by the inverter (IVT1) 78 and a HIGH-level signal is output to resetting terminals (RESETs) of the CPU 62 and the circuit 80. As a result, a reset signal is supplied to circuits in the intelligent battery 52.

After the time enough to reset the internal circuits of the intelligent battery 52 passes, the embedded controller 41 outputs a normal HIGH-level control signal (CTRL). Then, the field effect transistor (FET1) 85 is turned off, and an output of the comparator 73 becomes HIGH-level and an output of the inverter (IVT1) 78 becomes LOW-level. Therefore, resetting terminals (RESETs) of the CPU 62 and the circuit 80 becomes LOW-level and hardware resetting is completed. At this point of time, because the inside of the intelligent battery 52 is set to the initial state, it is possible to thereafter perform communication between the intelligent battery 52 and the embedded controller 41. However, because the above state is a forcibly initialized state, an actual capacity of a battery may be displayed as a remaining capacity=0 mA. In this case, it is possible to make the remaining-capacity data controlled by the CPU 62 of the intelligent battery 52 coincide with the actual capacity of the battery.

Then, a resetting method using the above hardware configuration is described below.

Figure 6:
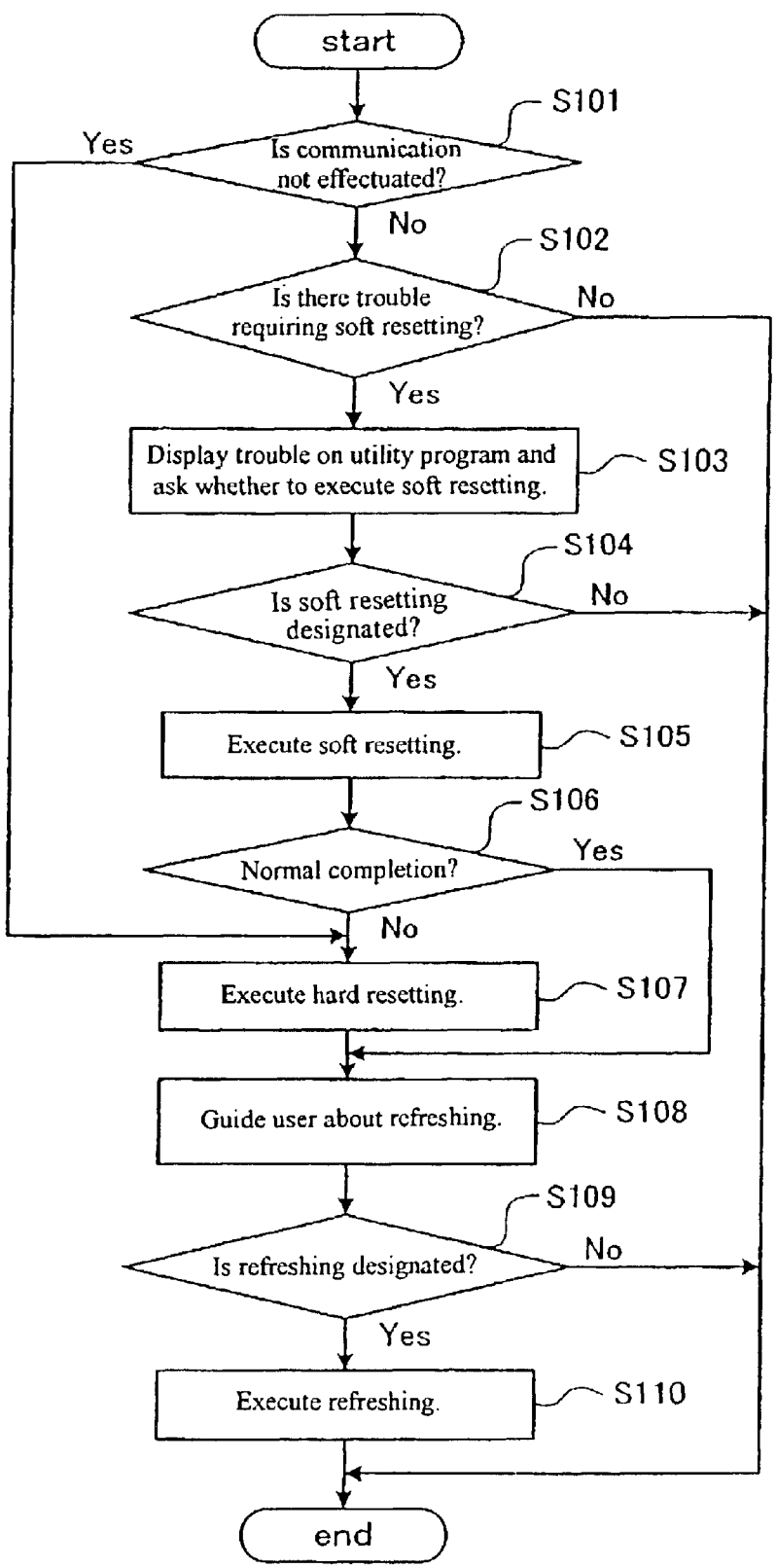
FIG. 6 is a flowchart showing a flow of the abnormal-state recovery to which this embodiment is applied.

FIG. 6 is a flowchart showing a flow of the abnormal-state recovery processing to which this embodiment is applied.

First, it is checked by a utility program to be executed by the CPU 11 of the computer system 10 whether communication is realized between the embedded controller 41 and he intelligent battery 52 (step 101). When a trouble that does not realize the communication occurs, step 101 jumps to step 107 because it is impossible to execute software resetting.

When communication is realized in step 101 but any trouble is found in communication data, the embedded controller 41 checks the necessity of software resetting (step 102). When no trouble is found, processing ends. The trouble may be one of the following symptoms.

* Though the intelligent battery 52 discharges, the remaining-capacity data of the intelligent battery 52 does not decrease.
* Large-remaining-capacity data which cannot be normally present is sent from the intelligent battery 52 {for example, FCC (Full Charge Capacity)<Remaining Capacity}.
* Though character data is requested to the intelligent battery 52, data not included in character codes is sent from the intelligent battery 52.
* The information showing an alarm or an error status is sent from the intelligent battery 52.
* Large charge/discharge count (Cycle Count) data that cannot be normally present is sent from the intelligent battery 52.

When any one of the above troubles is found, it is displayed in a utility program to be executed by the CPU 11 that any trouble is detected and it is asked to a user whether to execute soft resetting (step 103). Then, software resetting is executed (step 105) when a user designates software resetting in step 104 but processing ends when the user does not designate software resetting. The software resetting executed in the above case is the resetting to be executed by starting a utility program, which can be executed by extending an SBS protocol and adding a soft-resetting command.

When the embedded controller 41 sends the soft-resetting command to the intelligent battery 52 and resetting normally ends in the battery 52, the battery 52 sends a Return Code serving as a resetting completion code to the embedded controller 41. Return Code sent from the intelligent battery 52 is checked and the processing in step 108 is executed in the case of normal completion but hardware resetting in step 107 is executed in the case of abnormal completion because an error is found. That is, the embedded controller 41 is constituted so as to hard-reset the intelligent battery 52 when a soft-resetting command cannot be sent to the intelligent battery 52 or a resetting completion code cannot be received in a predetermined period.

When software resetting or hardware resetting is executed, the data in the intelligent battery 52 is initialized and thereby, the actual-capacity data in the intelligent battery 52 does not coincide with the remaining-capacity data in the battery 52. Therefore, a user is guided so as to perform refreshing (operation of completely discharging a battery and then charging the battery up to 100%)(step 108). As shown by the flow in FIG. 6, in the case of a system having an automatic refreshing function, the processing shown in step 109 is started. In the case of a system not having the automatic refreshing function, a guide is output to a user so as to execute refreshing and processing ends.

When automatic refreshing is designated by a user in step 109, refreshing is executed to make the actual capacity of the intelligent battery 52 coincide with the remaining capacity of it (step 110) and complete a series of processings. When refreshing is not designated, this flow is completed without executing refreshing. The automatic refreshing function is a function for increasing the capacity of the intelligent battery 52 to 100% by driving a system with the intelligent battery 52 and thereby discharging the intelligent battery 52 up to an almost completely-discharged state when the intelligent battery 52 and a power-supply unit (such as the AC adapter 51) are connected to the system and then, driving the system with the power-supply unit and charging the intelligent battery 52.

FIG. 7 is an illustration for explaining an example of the software resetting method shown by step 105 in FIG. 6. In this case, the SBS is extended by using OptionalMfgFunction1 (command code 0x3f) which can be freely defined by a user in a SBS command set. OptionalMfgFunction1 is defined as shown in FIG. 7. When resetting of the intelligent battery 52 is selected by a utility program, the embedded controller 41 outputs the command 0x3f to the intelligent battery 52. When the embedded controller 41 receives the data showing normal completion (bit 15 of word data is "0", Normal Completion) from the intelligent battery 52 within a specified time (e.g. 2 sec), software resetting normally ends. When the controller 14 cannot receive the data within the specified time (e.g. 2 sec) or the data showing abnormal completion (bit 15 of word data is "1", Error found), it is shown that the intelligent battery 52 cannot normally perform resetting.

As an example of the software resetting to be executed by the CPU 62, a mode is used in which it is determined whether a check sum present in a data area is correct and data is cleared when the check sum is not correct. Moreover, there is a mode of loading the data in a nonvolatile memory such as an EEPROM set in the intelligent battery 52.

Figure 8A:
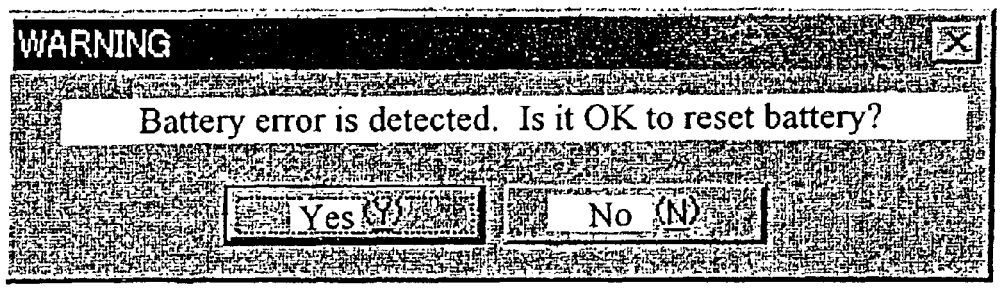
FIGS. 8A and 8B are illustrations showing screens for prompting a user to execute resetting and refreshing by opening another window.
Figure 8B:
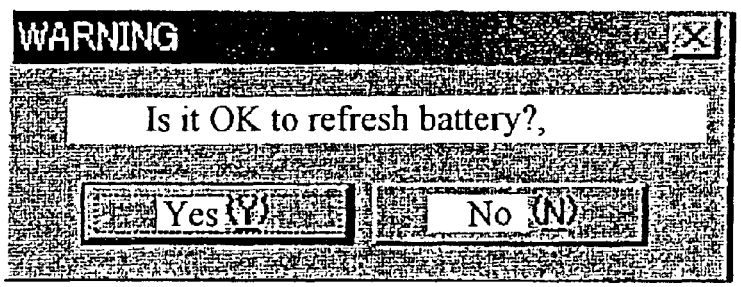

FIGS. 8A and 8B are illustrations showing screens for prompting a user to execute resetting or refreshing by opening another window. FIG. 8A shows a screen for prompting the user to execute the software resetting shown by step 103 in FIG. 6, in which a question saying, "Error of battery is detected. Is it OK to reset battery?" is asked to the user and a message box for asking an user's answer Yes or No to the question are displayed. FIG. 8B shows a screen for prompting the user to execute the refreshing shown by step 108 in FIG. 6, in which a question saying, "Is it OK to refresh battery?" and a message box for asking a user's answer Yes or No to the question are displayed. They are some of battery diagnosis menus in a utility program for the intelligent battery 52.

As described above, this embodiment is constituted so as to first attempt the settlement of a predetermined trouble by executing software resetting when the trouble is detected in the intelligent battery 52 and execute hardware resetting unless the trouble is settled. In the case of the intelligent battery 52, actually important data is stored in an EEPROM in the battery 52 but a part of the data may be lost due to hardware resetting. Moreover, there are some intelligent batteries 52 in which cycle count or remaining-capacity data is not written in an EEPROM and the held data may be lost due to hardware resetting. This embodiment makes it possible to correspond to these problems by executing software resetting.

Moreover, this embodiment is constituted so as to prompt refreshing after resetting them. When executing software resetting, stored remaining-capacity data may be cleared. For example, though a capacity of 50% or more remains, the remaining capacity may be recognized as "0%". Therefore, it is preferable to execute refreshing in order to make an actual capacity coincide with a present capacity. However, by using a configuration of constantly writing remaining-capacity data in an EEPROM or the like, it is not always necessary to execute refreshing after software resetting. However, to decrease the difference between the remaining-capacity data and the actual capacity, it is preferable to execute refreshing. Moreover, in the case of this embodiment, the screen display shown in FIG. 8A or 8B prompts a user to execute resetting or refreshing. For example, however, it is also possible to perform remote control so as to execute resetting (software resetting or hardware resetting) or refreshing of a battery from a service center serving as a Web site in accordance with Web access or the like from a notebook PC connected to a network.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
   an electrical apparatus which consumes power;
   an intelligent battery operatively connected to said electrical apparatus and supplying power thereto by discharging after being charged;
   trouble recognition circuitry coupled to said battery and which recognizes a trouble of said battery; and
   a resetting element which resets said battery in accordance with the recognition by the trouble recognition circuitry.

2. Apparatus according to claim 1, wherein said battery has a CPU and further wherein said resetting element effects a hardware reset of said CPU of said battery.

3. Apparatus according to claim 1, wherein said battery has a CPU and further wherein said resetting element effects a software resetting command to said battery to software-reset said CPU.

4. Apparatus comprising:
   a system for consuming power; and
   a battery having a CPU for communicating with the system to supply power to the system by discharging after being charged;
   wherein said CPU of said battery is reset when said CPU hangs up and becomes inoperable.

5. Apparatus according to claim 4, wherein said system outputs a resetting command using a communication protocol to said CPU of said battery, and said CPU of said battery executes the resetting command and then outputs completion of the resetting command to the system.

6. Apparatus according to claim 4, further comprising a signal line between said battery and said system and further wherein said system hardware-resets said CPU of said battery by using said signal line.

7. Apparatus according to claim 6, wherein said battery hardware-resets the CPU in accordance with a voltage level of the signal line.

8. Apparatus comprising:
   computer equipment;
   a battery operatively associated with said computer equipment and supplying power thereto by discharging after being charged;
   a controller communicating with said battery and controlling said battery; and
   a CPU which executes a utility program for the battery; and
   wherein said controller resets said battery in accordance with a designation from the utility program when it is recognized that a trouble occurs in communication with the battery.

9. Apparatus according to claim 8, further comprising a display operatively associated with said controller and said computer equipment which displays a screen prompting a user to execute the resetting when it is recognized by said controller that a trouble occurs in communication with said battery.

10. Apparatus according to claim 9, wherein said display displays a screen prompting a user to execute refreshing for said battery to completely discharge said battery after resetting is completed.

11. Apparatus according to claim 8, wherein said controller software-resets said battery by using a communication protocol and then hardware-rests said battery in the event software resetting fails to end normally.

12. Apparatus comprising:
    computer equipment;
    a battery connected to said computer equipment and supplying power thereto by discharging after being charged;
    a communication connection operatively associated with said battery and communicating with said battery in accordance with a predetermined protocol;
    a software-resetting element operatively associated with said battery and said communication connection and effective to software-resetting said battery by using said communication connection when a predetermined trouble occurs in the communication through said communication connection; and
    a hardware-resetting element operatively associated with said battery and effective to hardware-reset said battery in order to forcibly initialize said battery.

13. Apparatus according to claim 12, wherein said software-resetting element software-resets the battery by using a software-resetting command with an extended protocol.

14. Apparatus according to claim 12, wherein said hardware-resetting element hardware-resets the battery by using a terminal by which said computer equipment recognizes presence or absence of the battery.

15. Apparatus comprising:
    an intelligent battery suitable to be connected to an electrical apparatus to supply power thereto by discharging after being charged and having
    a cell for supplying power;
    a CPU for recognizing a state of said cell and communicating with the electrical apparatus; and
    resetting circuitry which resets said CPU under the control of the electrical apparatus.

16. Apparatus according to claim 15, wherein said resetting circuitry performs software resetting for resetting a program to be executed by the CPU and/or hardware resetting to be applied to the resetting terminal of the CPU.

17. A method comprising the steps of:
    determining whether a predetermined trouble occurs in the communication between an intelligent battery and an electrical apparatus body to which the battery is connected to supply power by discharging after being charged;
    prompting a user to execute a software reset of the battery when it is determined that a predetermined trouble occurs; and
    resetting the battery with a software command when software resetting is designated by a user.

18. A method comprising the steps of:
determining whether communication is possible between an intelligent battery and an electrical apparatus body to which the battery is connected to supply power by discharging after being charged;
hardware-resetting the battery when the communication is not possible.

19. A method comprising the steps of:
determining whether a predetermined trouble occurs in the communication between an intelligent battery and an electrical apparatus body to which the battery is connected to supply power by discharging after being charged;
executing a software reset of the battery in accordance with a determination that the predetermined trouble occurs; and
hardware-resetting the battery in the event that software resetting does not normally end.

* * * * *